United States Patent [19]
Tateno et al.

[11] Patent Number: 5,492,774
[45] Date of Patent: Feb. 20, 1996

[54] PERPENDICULAR MAGNETIC RECORDING MEDIUM AND PROCESS FOR PRODUCTION OF THE SAME

[75] Inventors: Yasuo Tateno; Hiroji Naruse; Mayumi Abe, all of Miyagi, Japan

[73] Assignee: Sony Corporation, Tokyo, Japan

[21] Appl. No.: 914,571

[22] Filed: Jul. 20, 1992

[30] Foreign Application Priority Data

Jul. 23, 1991 [JP] Japan ................................. 3-182708

[51] Int. Cl.$^6$ ................................. G11B 5/66; G11B 5/23; B05D 5/12
[52] U.S. Cl. .......................... 428/694 R; 428/694 T; 428/900; 427/128; 427/129; 427/130; 427/131; 427/132; 360/119
[58] Field of Search .............................. 428/900, 694 T, 428/694 R; 427/128, 129, 130, 131, 132; 360/119

[56] References Cited

U.S. PATENT DOCUMENTS

| | | | |
|---|---|---|---|
| 4,596,735 | 6/1986 | Noguchi | 428/215 |
| 4,645,690 | 2/1987 | Murakami | 427/128 |
| 4,766,034 | 8/1988 | Sato | 428/336 |
| 4,855,175 | 8/1989 | Wakai | 428/148 |
| 4,987,039 | 1/1991 | Daimon | 428/694 |
| 5,068,158 | 11/1991 | Futamoto | 428/694 |

*Primary Examiner*—L. Kilman
*Attorney, Agent, or Firm*—William S. Frommer; Alvin Sinderbrand

[57] ABSTRACT

A perpendicular magnetic recording medium having a magnetic layer comprised of a metal magnetic thin film on a nonmagnetic support. The half-value width of the switching field distribution obtained from a remanent magnetization curve in the intrinsic easy direction of magnetization (axis of easy magnetization from which shape magnetic anistrophy is removed) of the magnetic layer is no more than 40 kA/m.

Rectangular wave signals are recorded or reproduced on or from a Co—O type perpendicular magnetic recording medium with a direction $\theta_E$ of the axis of easy magnetization tilted in a range of 10° to 45° from the direction perpendicular to the plane of the film of the magnetic layer using a ring type magnetic head with a gap length Lg of not more than 0.18 μm.

7 Claims, 12 Drawing Sheets

PERPENDICULAR MAGNETIC RECORDING MEDIUM AND PROCESS FOR PRODUCTION OF THE SAME

BACKGROUND OF THE INVENTION

1. Field of the Invention

The present invention relates to a perpendicular magnetic recording medium suitable for use in a digital video tape recorder (VTR) etc. and a process for the production of the same Further, the present invention relates to a method of perpendicular magnetic recording and/or reproduction suitable for recording and reproduction of digital signals on a magnetic recording medium of a digital VTR, for example, in particular relates to a method of perpendicular magnetic recording and/or reproduction suitable for compressing and recording digital signals in a manner with little reproduction distortion.

2. Description of the Related Art

In the field of magnetic recording, high densities of recording are demanded each year. Further, the signal format is changing from analog to digital. This has made necessary both higher recording density and the design of a medium which can handle that signal format.

Up until now, the main system of magnetic recording has been so-called in-plane magnetic recording, which uses a magnetic recording medium with an axis of easy magnetization in the plane of the medium. In this system, however, the higher the recording density is raised, the more the directions of magnetization of the magnetic recording medium repulse each other when they are aligned, so there are inherent limits to increasing the recording density and it is difficult to achieve the high recording density demanded.

Further, in the in-plane magnetic recording system, in a pattern where flux inversion is repeated twice, the closer the intervals of the flux inversions (the higher the density), the worse the problems of peak shifts occurring due to mutual magnetic repulsion and waveform interference and the deterioration of the error rate.

In recent years, therefore, a new system of magnetic recording has been developed—the so-called perpendicular magnetic recording system, used for magnetic recording medium having an axis of easy magnetization in a direction perpendicular to the film plane. Great hopes are riding on its commercialization.

In the perpendicular magnetic recording system, the demagnetization action is much smaller than with the in-plane magnetic recording system and the magnetic domains are stable. By using this system, therefore, it becomes possible to strikingly increase the recording density.

As the magnetic recording medium used for the perpendicular magnetic recording system, use has mainly been made of a Co—O type perpendicular magnetic recording medium which has as its magnetic layer a Co—O alloy film etc. formed by vapor deposition.

In such a Co—O type perpendicular magnetic recording medium, the columnar particles of Co are arrayed in a direction perpendicular to the plane of the film covered by an oxide film and the axis of easy magnetization, or the C-axis, is oriented in this direction, so excellent perpendicular recording characteristics are obtained.

In such a perpendicular magnetic recording medium, the crystallinity and orientation of the alloy film have a major effect on the magnetic characteristics of the medium. By controlling well the crystallinity and the orientation, it is therefore possible to obtain excellent electromagnetic conversion characteristics. Therefore, to improve the electromagnetic conversion characteristics, it is desirable to elucidate the crystal structure and magnetic anistrophy of the alloy film and to set the suitable conditions for controlling the same.

On the other hand, digital signals are recorded and reproduced by the perpendicular magnetic recording system using a combination of the above-mentioned perpendicular magnetic recording medium and ring type magnetic heads.

When recording and reproducing rectangular wave signals by a combination of a perpendicular magnetic recording medium and ring type magnetic heads, however, the solitary reproduced wave becomes a dipulse waveform unique to the perpendicular magnetic recording system.

The biggest feature of the perpendicular magnetic recording system is the ability to record at a high density, but if the solitary reproduced wave becomes a dipulse waveform, equalization of the waveform, some change of the signal detection method, etc. become necessary and a circuit system performing more complicated signal processing compared with the longitudinal magnetic recording system becomes required.

SUMMARY OF THE INVENTION

The present invention has as its object the provision of a perpendicular magnetic recording medium, and a process for production of the same, which ensures excellent magnetic characteristics by considering the crystal structure and magnetic anistrophy of the perpendicular magnetic recording medium and elucidating the mechanism of magnetization and which gives excellent electromagnetic conversion characteristics and also the provision of a method of perpendicular magnetic recording and/or reproduction which makes use of the high density recording characteristic inherent to the perpendicular magnetic recording system and enables digital recording using a signal processing system of the same degree of simplicity as the in-plane magnetic recording system.

A Co—O alloy film displays superior magnetic characteristics when the axis of easy magnetization is slightly tilted rather than exactly perpendicular to the plane of the film. Further, the minimum magnetic unit is the microcrystals of Co. The axis of easy magnetization of the Co particles, that is, the C-axis, is oriented in the direction of incidence of the flow of vapor at the time of formation of the film.

The magnetic interaction of the perpendicular magnetic recording medium having the Co—O type alloy film as a magnetic layer derives from the dipole interaction among magnetic particles. The factor determining their signs is believed to be the cubic arrangement of the Co particles. By assuming that the magnitude of the interacting magnetic field caused by this magnetic interaction is proportional to the magnetization at that time, it becomes possible to correct the remanent magnetization curve including this interaction to a curve with no interaction.

The present invention is proposed based on these discoveries.

That is, the perpendicular magnetic recording medium of the present invention lies in a perpendicular magnetic recording medium having a magnetic layer comprised of a metal magnetic thin film on a nonmagnetic support, characterized in that the half-value width of the switching field distribution obtained from a remanent magnetization curve in the direction of the axis of easy magnetization from which the shape magnetic anistrophy of the magnetic layer has been removed is no more than 40 kA/m.

Further, the perpendicular magnetic recording medium of the present invention lies in a perpendicular magnetic recording medium having a magnetic layer comprised of a metal magnetic thin film on a nonmagnetic support, characterized in that the angle $\theta_E$ formed between the direction of the axis of easy magnetization of the magnetic layer from which the shape magnetic anistrophy has been removed and the normal direction of the magnetic layer is $10° \leq \theta_E \leq 40°$.

Further, the process of production of the perpendicular magnetic recording medium of the present invention lies in a process for production of a perpendicular magnetic recording medium which forms a magnetic layer made by the vapor deposition method on a nonmagnetic support, characterized in that the angle $\theta$ formed between the normal direction of the surface of the nonmagnetic support and the direction of incidence of the flow of vapor from the source of vaporization at the time of forming the magnetic layer is changed within a range of 10° to 40°.

Further, the method of perpendicular magnetic recording and/or reproduction of the present invention is characterized in that the recording is performed using ring type magnetic heads with a gap length Lg of less than or equal to 0.18 μm on a perpendicular magnetic recording medium having as a magnetic layer on a nonmagnetic support a metal magnetic thin film which has a half-value width of the switching field distribution obtained frown a remanent magnetization curve in the direction of the axis of easy magnetization from which the shape magnetic anistrophy of the magnetic layer has been removed of no more than 40 kA/m.

By making the half-value width of the switching field distribution obtained from a remanent magnetization curve in the direction of the intrinsic axis of easy magnetization of the magnetic layer no more than 40 kA/m, excellent magnetic characteristics can be obtained and the characteristics of the reproduction output are improved.

Further, in a perpendicular magnetic recording medium with a magnetic layer comprised of a Co—O alloy film, the minimum magnetic unit is a microcrystal of Co and the axis of easy magnetization of the Co particles, that is, the C-axis, is oriented in the direction of incidence of the flow of vapor at the time of formation of the film. Therefore, by changing the angle $\theta$ formed between the normal direction of the surface of the nonmagnetic support and the direction of incidence of the flow of vapor from the source of vaporization at the time of forming the magnetic layer within a range of 10° to 40°, the direction of the axis of easy magnetization of the resultant perpendicular magnetic film can be controlled well and superior magnetic characteristics can be obtained.

On the other hand, the solitary reproduced wave obtained by recording rectangular wave signals with a repeating wavelength λ of 38 μm, for example, is like those shown by A or B in FIG. 1, so the dipulse ratio is defined as follows:

Dipulse ratio=b/a    (1)

When recording or reproducing rectangular wave signals with a combination of a magnetic recording medium with a substantially perpendicular direction of the axis of easy magnetization and ring type magnetic heads, the solitary reproduced waveform becomes a dipulse waveform unique to the perpendicular magnetic recording system and the dipulse ratio becomes large in value.

As opposed to this, when recording or reproducing rectangular wave signals using a Co—O type perpendicular magnetic recording medium with a direction $\theta_E$ of the axis of easy magnetization tilted in a range of 10° to 45° from the direction perpendicular to the plane of the film of the magnetic layer and running ring type magnetic heads with a gap length Lg of not more than 0.18 μm in the direction of the arrow X in FIG. 1, the solitary reproduced waveform becomes a substantially single-peak type waveform with a dipulse ratio of not more than 0.12.

Therefore, it is possible to effectively make use of the dual advantages of the high density recording characteristic of the perpendicular magnetic recording system and the applicability of a relatively simple signal processing system of the longitudinal magnetic recording system and it is possible to build a high density magnetic recording system for digital video signals.

DESCRIPTION OF THE PREFERRED EMBODIMENTS

Figure 1A:
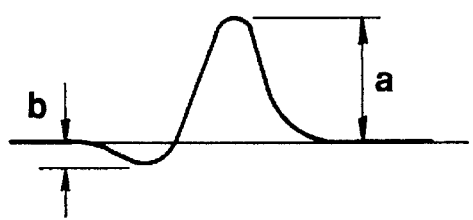
FIG. 1 is a waveform diagram for explaining the dipulse ratio.
Figure 1B:
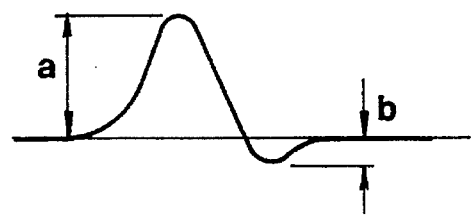

The perpendicular magnetic recording medium of the present invention is comprised of a metal magnetic thin film with a magnetic layer formed mainly by the vapor deposition method.

As the metal magnetic thin film, use may be made of an alloy film having an axis of easy magnetization in a direction perpendicular to the plane of the film. In particular, a Co—O type perpendicular magnetic film is suitable.

The Co—O type perpendicular magnetic film may have a composition 100 percent Co, but a small amount of Ni may be added to improve the contact characteristic with the magnetic heads. The addition of Ni has an effect on the so-called cupping and is useful in improving the cupping. In particular, if the amount of Ni added is 3 to 10 atomic percent, the effect of improvement of the cupping results in an improvement in the interface between the medium and heads and thus superior electromagnetic conversion characteristics are displayed in a magnetic recording system using a rotary drum.

Therefore, the above-mentioned Co—O type perpendicular magnetic film preferably has a composition of:

$$(Co_{1-x}Ni_x)_{1-m}O_m \quad (2)$$

(where, $0.03 \leq x \leq 0.10$, $0.1 \leq m \leq 0.3$).

In the present invention, the parameter used for evaluating the magnetic characteristics of the metal magnetic thin film is the half-value width of the switching field distribution obtained from the remanent magnetization curve in the direction of the intrinsic axis of easy magnetization from which the shape magnetic anistrophy has been removed. This value is defined as being no more than 40 kA/m. When the half-value width of the switching field distribution of the metal magnetic thin film is no more than 40 kA/m, the crystallinity and the orientation of the metal magnetic thin film are well controlled, superior magnetic characteristics are obtained, and the characteristics of the reproduction output in the short wavelength are improved. When the half-value width of the switching field distribution exceeds 40 kA/m, it becomes impossible to secure a sufficient reproduction output.

The switching field distribution (SFD) is found by differentiating the reinanent magnetization curve.

The method of use of the SFD as a parameter when evaluating magnetic characteristics has been general practice in known in-plane magnetic recording media, but as mentioned earlier when measuring the remanent magnetization curve in a direction other than the in-plane direction, the applied magnetic field is influenced by the demagnetizing field caused by the magnetization of the medium, so correction of the demagnetizing field becomes necessary.

Therefore, in the present invention, the SFD is found in the following way.

First, the magnetic field applied to the medium, which is in an AC demagnetized state, is increased in stages in the direction increasing the magnetization and the H-M hysteresis loop in the direction of the intrinsic axis of easy magnetization is found.

Next, assuming that the demagnetizing factor $Nd=\sin^2\theta$, the remanence Mi(H) on the straight line $H=Nd \cdot M$ is found from the H-M hysteresis loop.

Further, since the remanent magnetization curve thus obtained is measured in a state including the magnetic interaction of the medium, the remanent magnetization curve is corrected to a state free from this interaction.

At this time, it is possible to correct the remanent magnetization curve by assuming that the interacting magnetic field is proportional to the magnetization of the medium itself.

The reason is as follows.

That is, the magnetic interaction may be found by comparing the isothermal remanent magnetization curve (IRMC) obtained when increasing the applied magnetic field in stages to the medium in the AC erasure state in a direction increasing the magnetization and a demagnetization remanence curve (DCD curve) obtained when increasing the applied magnetic field in stages in a direction opposite to the magnetization, that is, in a direction reducing the magnetization, after the magnetization of the medium is once saturated in a certain direction.

The IRM curve and the DCD curve both express the cumulative degree of the switching field. The two should inherently match when the same sample is used, but in actuality due to the differences in the history of the magnetization at the time of measurement of the curves, some difference occurs between the two. This difference is believed due to the magnetic interaction of the medium.

Assuming now that the value of the remanence obtained after causing saturation of magnetization by a sufficiently large magnetic field, that is, the value of the magnetization on the IRM curve defined by the maximum value $M_r$ of the remanence, is $M_i(H)$ and similarly that the value of the magnetization on the DCD curve defined by the remanence $M_r$ is $M_d(H)$, when there is no magnetic interaction in the medium, the relationship of the following equation (3) stands between the two:

$$M_d(H)=1-2M_i(H) \quad (3)$$

(where, in equation (3), $M_d(H)$ changes from +1 to −1 along with an increase in the magnetic field and $M_i(H)$ changes from 0 to +1).

However, there are few cases where the equation (3) is applied. In actuality, a magnetic interaction works on the medium.

For example, considering a perpendicular magnetic recording medium having the Co—O type alloy film as a magnetic layer, this perpendicular magnetic recording medium is a so-called solitary particle type medium wherein the smallest magnetic unit is a microcrystal of Co. The magnetic interaction in such a medium may be considered to be due to the static magnetic interaction between Co particles, that is, the bipole interaction between magnetic moments.

Here, looking at a single Co particle in the medium, the Co particle is influenced by the magnetic field created by the magnetization of the surrounding particles, so a magnetization behavior different from that in the case of a solitary presence is displayed. For example, when a magnetic field of a certain magnitude is applied to the medium, the magnitude H of the magnetic field applied to the Co particle, as shown in the following equation (4), is a combination of the applied magnetic field $H_0$ and the interacting magnetic field $H_1$ created by the surrounding magnetization:

$$H=H_0+H_1 \quad (4)$$

Therefore, due to the presence of a magnetic field caused by the surrounding magnetization, the magnitude of the applied magnetic field required for the flux inversion of the Co particles seems to change. That is, the shape of the reinanent magnetization curve changes due to the interacting magnetic field.

From this, a difference between $M_d(H)$ and $1-2M_i(H)$ is created by the difference ($\Delta H$) of the magnetic field necessary for flux inversion and the difference $\Delta M$ of magnetization may be interpreted as merely the result. Therefore, the relationship shown by the following equation (5) is obtained:

$$M_d(H)=1-2M_i(H+\Delta H) \quad (5)$$

In this way, in a perpendicular magnetic recording medium having a Co—O type alloy film as a magnetic layer, the interacting magnetic field is caused by the dipole interaction between the Co particles, so the magnitude of the same may be guessed to be proportional to the magnitude of the mean magnetization of the medium.

The following may be said about this interacting magnetic field.

First, from the two reinanent magnetization curves, $M_d(H)$, and $M_i(H)$, the remanent coercive forces are individually defined.

That is, with the DCD curve, if one-half of all the particles invert in flux, then $M_d(H)=0$. The magnitude of the magnetic field at this time is the remanent coercive force Hr of the DCD curve. Further, with the IRM curve, when one-half of all the particles invert in flux, $M_i(H)$ becomes 0.5 and the magnitude of the magnetic field at this time is the remanent coercive force Ha of the IRM curve.

The remanent coercive force Hr is considered to be free from almost all effect of interaction since it is a remanent coercive force with a remanence of substantially zero. As opposed to this, the remanent coercive force Ha is clearly affected by interaction since the remanence is the remanent coercive force of one-half of the maximum value $M_r$. Therefore, if the remanent coercive force Hr and the remanent coercive force Ha are compared, it is possible to find the magnetic interaction of the medium.

For example, when the remanent coercive force Hr is less than the reinanent coercive force Ha, this means that the magnetization of the medium itself is blocking the flux inversion and signifies that a negative interaction is at work. Conversely, when the remanent coercive force Hr is greater than the reinanent coercive force Ha, it means that a positive interaction is at work.

From the above, the interacting magnetic field $H_1$ is expressed by the difference between the remanent coercive force Hr and the remanent coercive force Ha and the magnitude of the same is assumed to be proportional to the magnitude of the magnetization at that time. Therefore, frown the inference of the demagnetizing factor $N_d$, the interacting magnetic field coefficient $N_1$ is expressed by the following equation (6):

$$N_1=(Hr-Ha)/M \quad (6)$$

Note that in equation (6), M corresponds to the remanence when the applied magnetic field is the remanent coercive force Ha and is worth one-half of the maximum value $M_r$ of the remanence.

That is, the magnitude H1 of the interacting magnetic field is expressed by the following equation (7):

$$H_1=N_1 \cdot M_i(H) \quad (7)$$

In this way, by defining the magnitude $H_1$ of the interacting magnetic field by the magnitude of magnetization at that time, it is possible to grasp the interaction regardless of the type of the medium.

Figure 2:
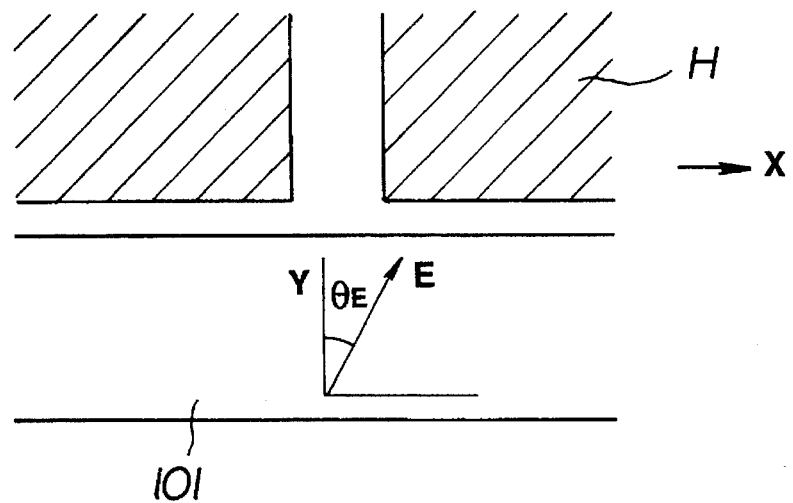
FIG. 2 is a schematic view for explaining the direction $\theta_E$ of the axis of easy magnetization of the magnetic layer and the running direction of the magnetic heads.

In the perpendicular magnetic recording medium of the present invention, to make the half-value width of the SFD found in this way fall into the above range, it is necessary not that the direction of the axis of easy magnetization be completely perpendicular to the plane of the film, but that, as shown in FIG. 2, the direction E of the intrinsic axis of easy magnetization be set to be tilted 10° to 40° with respect to the normal direction Y of the magnetic layer 101. That is, in the present invention, the angle $\theta_E$ between the direction E of the axis of easy magnetization and the normal direction Y is set to a range of $10° \leq \theta_E \leq 40°$. If $\theta_E$ is less than 10°, the dipulse ratio becomes larger, while if $\theta_E$ is over 40°, the advantages of the perpendicular magnetic recording are lost.

The direction E of the axis of easy magnetization of the Co—O type perpendicular magnetic film is tilted with respect to the normal direction Y by, for example, when forming the Co—O type alloy film by vapor deposition, arranging masks between the nonmagnetic support made to move and run in a predetermined direction and a vaporization source and by using the masks to control the range of the angle $\theta$ formed between the normal direction of the surface of the nonmagnetic support and the direction of incidence of the flow of vapor from the vaporization source.

The angle $\theta$ is correlated with the direction of the axis of easy magnetization of the resultant Co—O type alloy film. If the range of change is set to 10° to 40°, the direction E of the axis of easy magnetization can be controlled to the desired range.

On the other hand, in the method of perpendicular magnetic recording and/or reproduction of the present invention, the recording is performed using ring type magnetic heads having a gap length Lg of no more than 0.18 μm. By this, it is possible to make use of the characteristics of a perpendicular magnetic recording medium mentioned above and record at a high density well and further obtain superior electromagnetic conversion characteristics. If the gap length Lg exceeds 0.18 μm, the effect of this is weakened from the viewpoint of high density recording.

The saturation flux density Bs of the ring type magnetic heads is preferably made not less than 13 kG and therefore it is desirable to place on the magnetic gap forming surface a soft magnetic metal thin film having a high saturation flux density and form a magnetic gap between the soft magnetic metal thin films to make composite type magnetic heads.

To make the recording density of the recording system more than $8 \times 10^5$ bit/mm$^2$, the track width of the magnetic gap of the ring type magnetic heads must be made not more than 7 μm.

Further, in the present invention, when recording or reproducing, as shown in FIG. 2, the ring type magnetic heads are made to run along the tilted direction (direction of arrow X in the figure) of the axis of easy magnetization of the magnetic layer 101 of the perpendicular magnetic recording medium. By this, even when recording or reproducing digital signals, the solitary reproduced wave becomes a substantially single-peak waveform with a dipulse ratio of no more than 0.12 and therefore it is possible to obtain excellent electromagnetic conversion characteristics.

Below, a detailed explanation will be given of embodiments of the application of the present invention referring to the drawings and experimental findings.

EXPERIMENT 1

In this experiment, a study was made of the conditions required in the medium for obtaining excellent electromagnetic conversion characteristics in a magnetic tape of the metal magnetic thin film type using a Co—O type perpendicular magnetic film as the magnetic layer.

First, an explanation will be made of the configuration of a continuous winding type vacuum deposition apparatus used when forming the Co—O type perpendicular magnetic film of the above magnetic tape.

Figure 3:
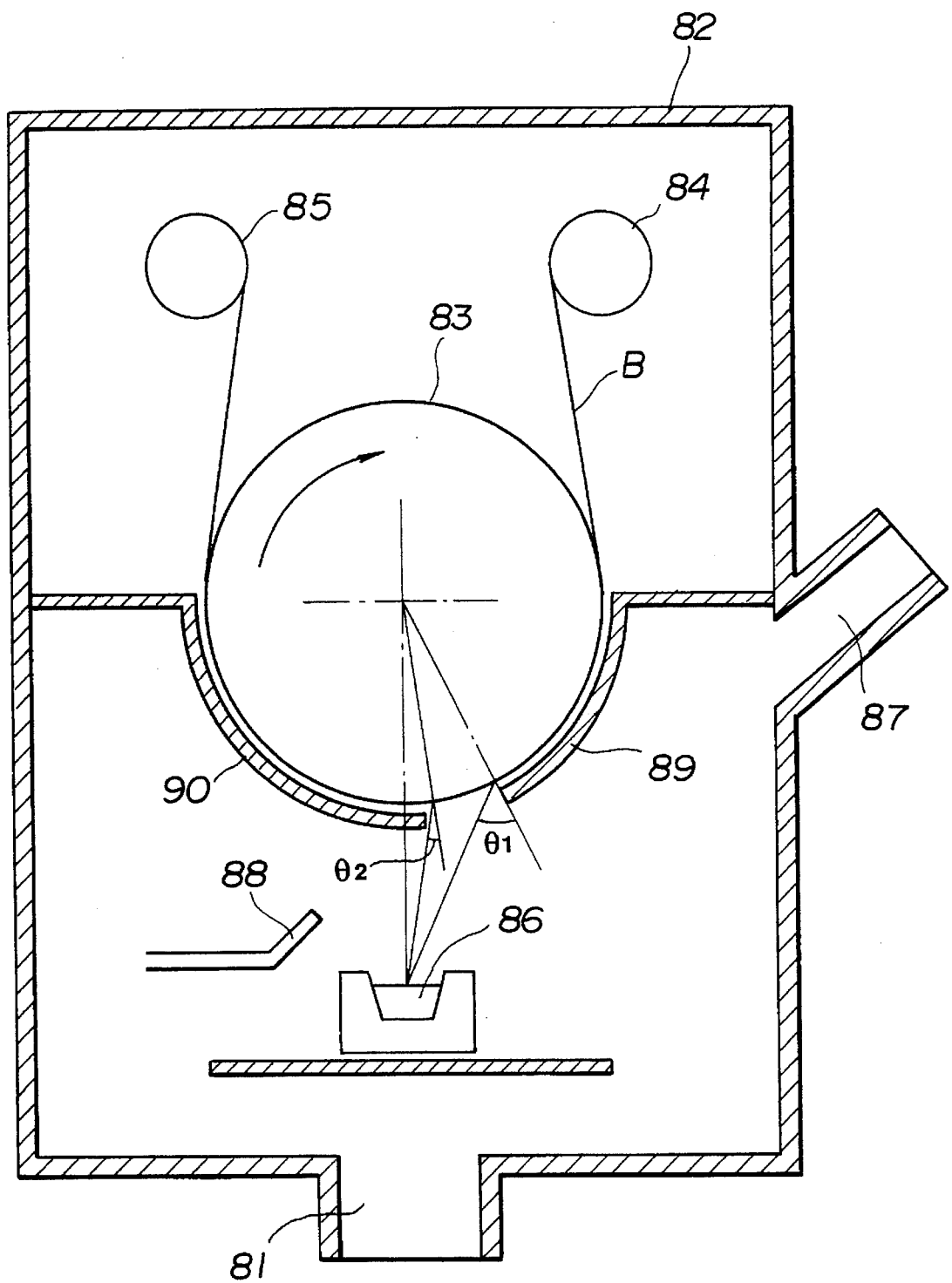
FIG. 3 is a schematic view of an example of the configuration of a vacuum deposition apparatus.

The vacuum deposition apparatus, as shown in FIG. 3, has a cooling can 83 disposed at the rough center of a vacuum chamber 82 maintained at a high level of vacuum by an exhaust system 81. Further above from the cooling can 83 is disposed a take-out roll 84 and a take-up roll 85.

Therefore, a base film B is fed out from the take-out roll 84 to the cooling can 83 and runs along the cooling can 83, whereby a Co—O type perpendicular magnetic film is formed, then is taken up on the take-up roll 85.

On the other hand, below the cooling can 83, there is disposed in a facing manner a vaporization source 86 comprised of Co or Co—Ni alloy etc. Upward at a slant from the vaporization source 86 there is an electron gun 87. The vaporization source 86 is heated by irradiation of an electron beam from the electron gun 87 so as to vaporize.

Between the vaporization source 86 and the cooling can 83, there is disposed an oxygen introduction pipe 88 for mixing oxygen into the flow of vapor and thus introduce oxygen into the thin film. It is designed so that the amount of oxygen gas introduced may be freely controlled and ejected on to the base film B so as to control the concentration of oxygen in the deposited Co—O type perpendicular magnetic film.

Near the cooling can 83 there are placed a pair of incident angle limiting masks 89 and 90 for restricting the angle of incidence of the flow of vapor from the vaporization source 86. Therefore, the maximum angle of incidence $\theta_1$ and the minimum angle of incidence $\theta_2$ at the time of formation of the film are determined by the position of the opening between the incident angle limiting masks 89 and 90.

Various types of sample tapes were fabricated using the vacuum deposition apparatus of the above configuration and changing the maximum angle of incidence $\theta_1$ and the tninimum angle of incidence $\theta_2$ of the flow of vapor so that the direction $\theta_E$ of the intrinsic axis of easy magnetization of the resultant Co—O type perpendicular magnetic film becomes 30° (average).

Note that at the time of formation of the film, a CoNi alloy with 5.0 atomic percent of Ni added is vaporized by the electron gun-heated vaporization source, oxygen gas is introduced into the vacuum chamber during the vapor deposition, and a longitudinal polymer film (thickness of 6.0 μm, Young's modulus of 1200 kg/mm$^2$) comprised of polyimide was made to run continuously through it to form a CoNi alloy film at a rate of about 2500 Å/sec. The total thickness of the CoNi alloy film was suitably controlled by changing the running speed of the longitudinal polymer film.

During the vapor deposition, the cooling can supporting the longitudinal polymer film was cooled by a coolant and controlled so that the surface temperature of the can fell below 0° C. The amount of oxygen gas introduced was suitably set after finding the optimum value with different media. Note that the atmospheric gas pressure in the vacuum chamber during the vapor deposition was made $1.5\times10^{-4}$ to $3.0\times10^{-4}$ Torr.

The longitudinal medium thus obtained was coated on the surface of the magnetic layer with a fluorine type lubricant and then was slit into 8 mm widths and used as tape-like samples.

The thus prepared sample tapes were investigated as to their half-value widths of the switching field distribution (SFD) obtained from a remanent magnetization curve at a direction $\theta_E$ of the intrinsic axis of easy magnetization from which the shape magnetic anistrophy of the magnetic layer had been removed.

Figure 4:
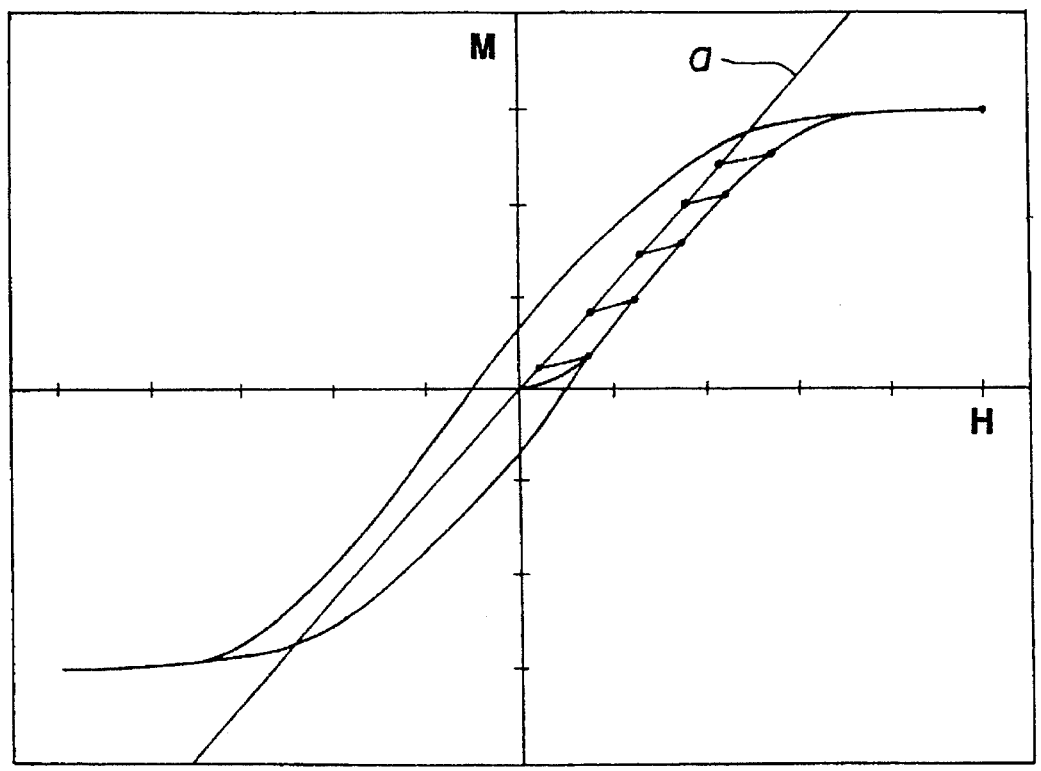
FIG. 4 is an H-M hysteresis loop in the direction of the intrinsic axis of easy magnetization of the perpendicular magnetic recording medium according to the present invention.

Note that the half-value width of the SFD is found as follows:

That is, the applied magnetic field was increased in stages with respect to sample tapes in an AC erasure state in a direction increasing the magnetization and then the H-M hysteresis loop was measured. The results are shown in FIG. 4.

In the thus obtained H-M hysteresis loop, to consider the effects of the demagnetizing field caused by the magnetization of the medium by the applied magnetic field, the remanence $M_i(H)$ on the line $H=N_d\cdot M$ (line a in FIG. 4) was founded assuming the demagnetizing factor $N_d=\sin^2\theta$. The results are shown in FIG. 5 (curve a in the figure).

Next, the remanent magnetization curve a includes the magnetic interaction of the medium, so this is corrected to a curve with no such interaction. At this time, the magnitude $H_1$ of the interacting magnetic field caused by the magnetic interaction of the medium was assumed to be proportional to the magnetization at that time. The thus corrected reinanent magnetization curve b is also shown in FIG. 5.

Figure 5:
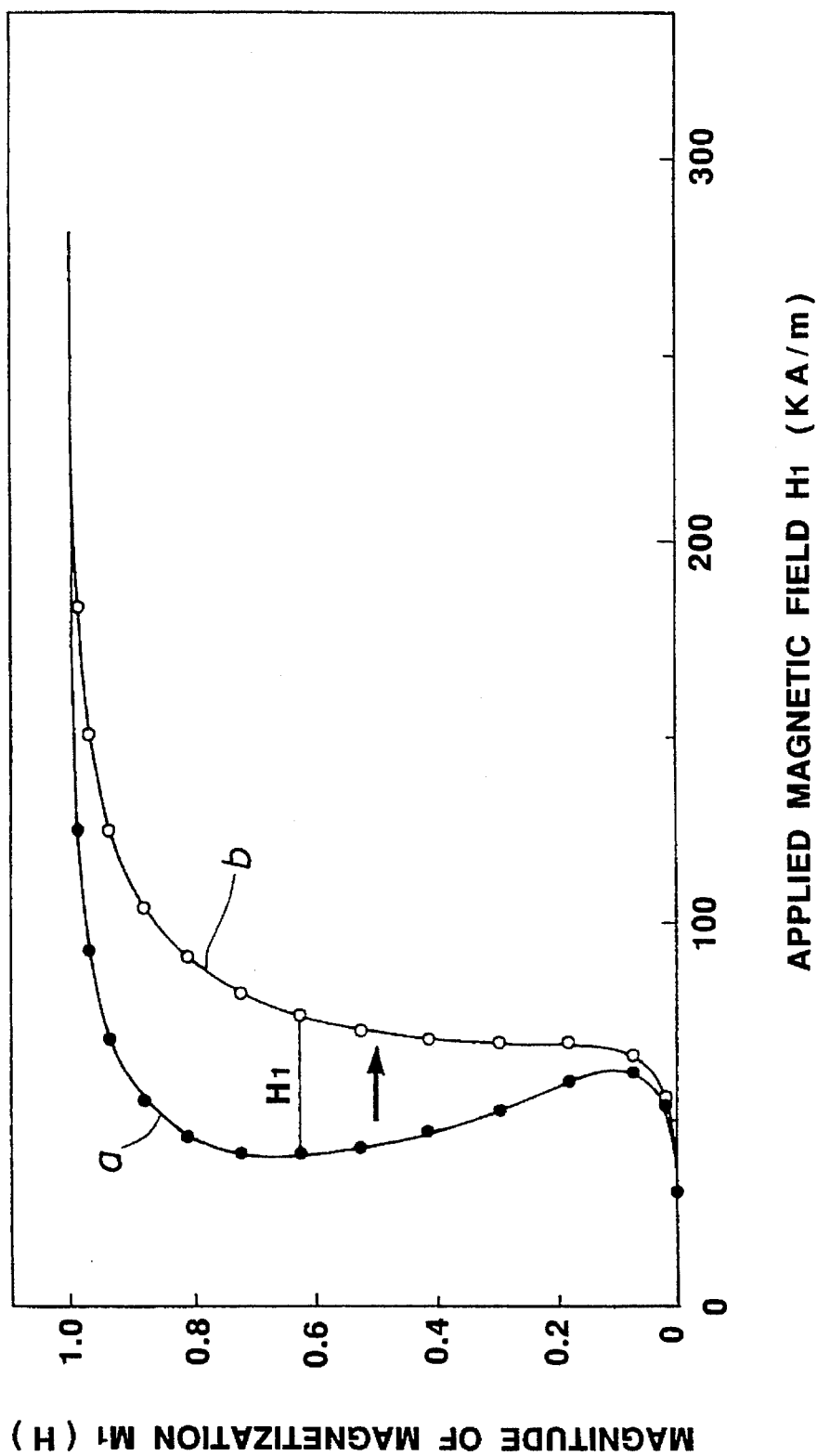
FIG. 5 is a remanent magnetization curve before correction of the demagnetizing field of the perpendicular magnetic recording medium according to the present invention and the remanent magnetization curve after the correction of the demagnetizing field.

From FIG. 5, it is seen that while the remanent magnetization curve a before correction is an S-shaped curve (overhang), the remanent magnetization curve b after correction rises very sharply, but has no overhang. From this, it may be said that the reasons the overhang occurs is the positive interaction of the medium.

The corrected remanent magnetization curve b was differentiated. By this, the SFD was found as shown in FIG. 6.

Figure 6:
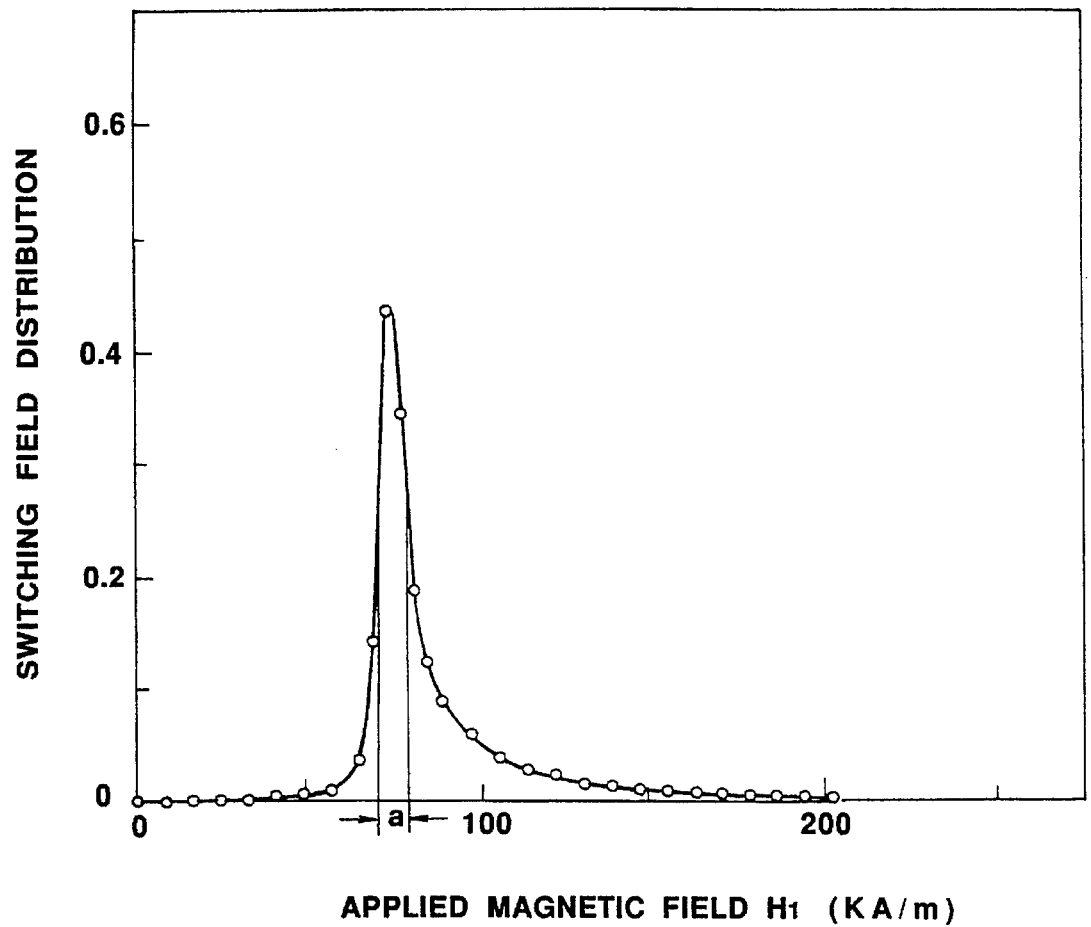
FIG. 6 shows the switching field distribution of the perpendicular magnetic recording medium according to the present invention.

From FIG. 6, if the demagnetizing field is corrected as mentioned above, the SFD with a peak having a finite width a near 750 Oe is found.

The half-value width of the peak of the SFD was measured.

The direction $\theta_E$ of the axis of easy magnetization was measured as follows using a magnetic torquemeter and was expressed by the angle of tilt at the time when the normal direction of the film surface was made 0°.

Figure 7:
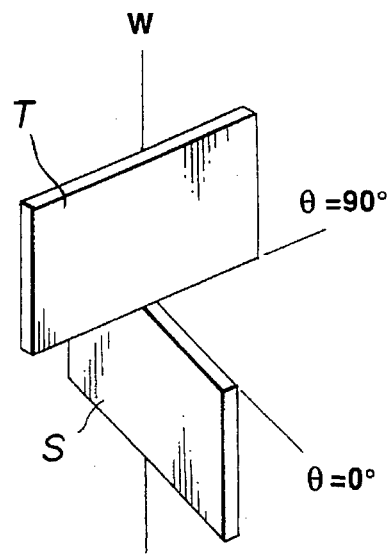
FIG. 7 is a schematic view for explaining the method of measurement of the magnetic anistrophy constant by a magnetic torquemeter.

That is, as shown in FIG. 7, two samples S and T of the same shape were prepared and were disposed so that the planes of their films intersected and affixed to a rotational shaft W. Note that the orientations of the film planes of the samples S and T at that time were set so that the axes of easy magnetization of the same existed in the same quadrant.

Next, the direction of the applied field was made the direction of the plane of the films of the sample S and sample T, the magnitude of the applied field was changed in that state, the dependence on the applied field of the torque occurring in the two samples S and T affixed to a rotational shaft W was found, and the magnetic anistrophy constant was found in accordance with the torque data analysis method of Miyajima et al. (*J. Appl. Phys.* 47,4669, (1976)), That is, the relationship between the torques at the magnetic fields H and $(L/H)^2$ was plotted on a graph and the magnetic anistrophy constant $K_N$ was determined from the slant of the straight line portion of the graph obtained by extrapolating the applied field to infinity.

The magnetic anistrophy constant $K_N$ determined here is the apparent magnetic anistrophy constant of the combination of the two intersecting samples S and T. On the other hand, the following relation stands between the true magnetic anistrophy constant $K_O$ of the samples S and T and the apparent magnetic anistrophy constant $K_N$:

$$K0 = K_N / \sin 2\theta E \qquad (8)$$

Therefore, by inserting the apparent magnetic anistrophy constant $K_N$ found above in the equation (8), it is possible to find the true magnetic anistrophy constant $K_0$.

The half-value widths of the SFD found in this way are shown in Table 1.

TABLE 1

| Sample tape no. | Max. incident angle $\theta_1$ (°) | Min. incident angle $\theta_2$ (°) | Direction of axis of easy magnetization $\theta_E$(°) | SFD half-value width (kA/m) | Reproduced output at 0.5 µm (dB) |
| --- | --- | --- | --- | --- | --- |
| Ex. 1 | 35 | 25 | 30 | 30 | 0 |
| Ex. 2 | 40 | 20 | 30 | 36 | −0.1 |
| Ex. 3 | 40 | 15 | 30 | 40 | −0.3 |
| Comp. Ex. 4 | 50 | 10 | 30 | 49 | −1.0 |
| Comp. Ex. 5 | 55 | 5 | 30 | 60 | −2.7 |
| Comp. Ex. 6 | 60 | 0 | 30 | 82 | −5.1 |

Next, use was made of a modified VTR deck made by Sony (brandname Hi-8 EV-S900) to measure the reproduction output of sample tapes at a recording wavelength of 0.5 µm. The results are shown in Table 1.

As shown in Table 1, in a Co—O type perpendicular magnetic film which is set so that the direction $\theta_E$ of the axis of easy magnetization is 30°, the reproduction output characteristic at a short wavelength became extremely good when the half-value width of the SFD was less than 40 kA/m.

Further, it was found that to make the half-value width of the SFD be in the above range, it was sufficient to control the angle of incidence of the flow of vapor at the time of formation of the film to a range of 10° to 40°.

Next, digital signals were recorded and reproduced by ring heads on and from a Co—O type perpendicular magnetic recording medium set so that the direction $\theta_E$ of the intrinsic axis of easy magnetization of the magnetic layer became in a range of 10° to 40° based on the results of the above Experiment 1, and then the electromagnetic conversion characteristic was studied.

EXPERIMENT 2

In this experiment, two types of Co—O type perpendicular magnetic recording media with different directions of the axis of easy magnetization and two types of ring type magnetic heads with different gap lengths were used to make a total of four combinations and the recording and reproduction characteristics of the same when performing recording and reproduction were studied.

Note that the Co—O type perpendicular magnetic recording media were prepared as follows using the vacuum deposition apparatus used in Experiment 1.

That is, a CoNi alloy with 5.0 atomic percent of Ni added was vaporized by an electron gun-heated vaporization source, oxygen gas was introduced inside the vacuum chamber during the vapor deposition, and a partially oxidized CoNi alloy film was formed on a longitudinal polymer film in a continuous fashion.

At this time, the beam for vapor deposition of the CoNi alloy was incident at an angle of $\theta_1 = 45°$ and $\theta_2 = 15°$ for the medium A and $\theta_1 = 15°$ and $\theta_2 = -15°$ for the medium B by setting incident angle limiting masks.

As the longitudinal polymer film, use was made of a polyimide film of a thickness of 6.0 µm and a Young's modulus of 1200 kg/mm². The running speed was set to 16 m/min, the CoNi alloy was vapor deposited at a film forming speed of about 2500 Å/sec, and the thickness of the magnetic layer was made 2000 Å.

During the vapor deposition, the cooling can supporting the longitudinal polymer film was cooled by a coolant to be controlled so that the can surface temperature was not more than 0° C. The amount of oxygen gas introduced was suitably found for each medium. Vapor deposition was performed under conditions of 380 cc/min for the medium A and 400 cc/min for the medium B. The atmospheric gas pressure in the vacuum chamber during the vapor deposition was made $1.8 \times 10^{-4}$ Torr in both cases.

The resultant longitudinal medium was coated with a fluorine type lubricant on the surface of the magnetic layer and was then slit into 8 mm widths which were used as the tape-like samples.

The saturation magnetic flux density Bs, the coercive force Hc(V) in the perpendicular direction, and the effective anistrophic magnetic field Hk(eff) were measured for the medium A and the medium B thus prepared by a vibrating sample type magnetometer (VSM).

Further, the intrinsic magnetic anistrophy constant $K_0$ not including the shape magnetic anistrophy of the film and the direction $\theta_E$ (direction of axis of easy magnetization) of the same were measured using a magnetic torquemeter.

The conditions of fabrication of the medium A and the medium B are shown in Table 2 and the magnetic characteristics (Bs, Hc(V), Hk(eff), $K_0$, $\theta_E$) of the same are shown in Table 3. The direction $\theta_E$ of the axis of easy magnetization was expressed as the angle of inclination from the normal direction of the plane of the film, which is considered 0°.

TABLE 2

| | Angle of incidence of vapor deposition (θ) | Alloy composition (Am't Ni added) | Am't of oxygen introduced (cc/min) | Film thickness (Å) |
| --- | --- | --- | --- | --- |
| Medium A | 15° ≦ θ ≦ 45° | 5 atomic % | 380 | 2000 |
| Medium B | −15° ≦ θ ≦ 15° | 5 atomic % | 400 | 2000 |

TABLE 3

|  | Bs (G) | Hc(V) (Oe) | Hk(eff) (kOe) | $\theta_E$ | K0 (erg/cc) |
|---|---|---|---|---|---|
| Medium A | 8200 | 1250 | 4.90 | 25° | $2.7 \times 10^6$ |
| Medium B | 8250 | 1200 | 5.00 | 0° | $2.8 \times 10^6$ |

Figure 8:
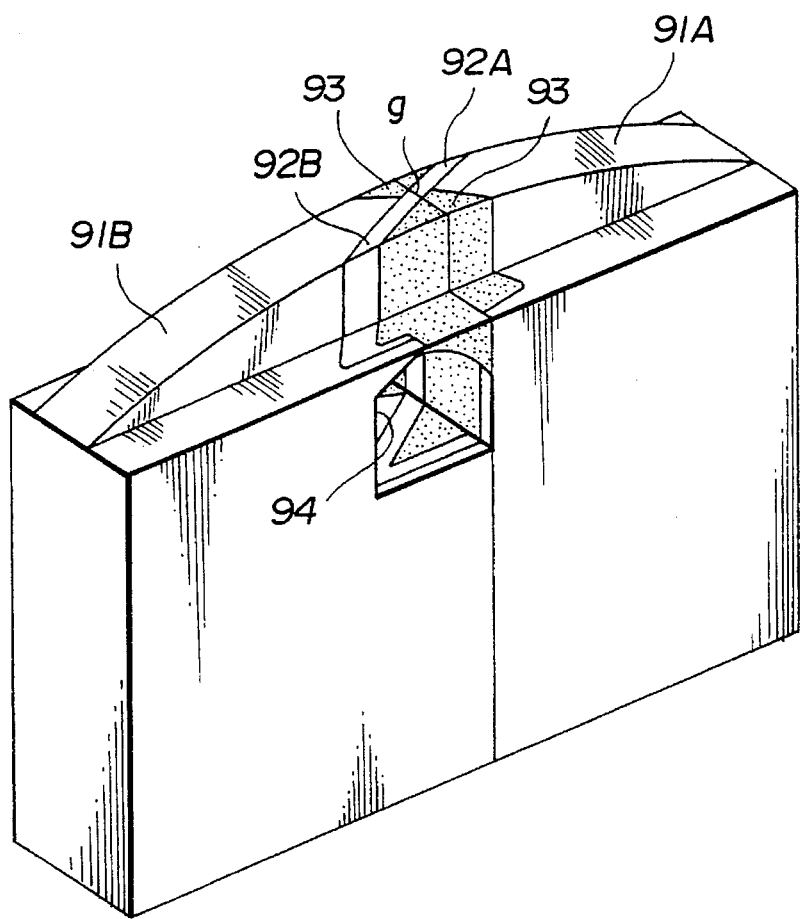
FIG. 8 is a rough perspective view of the configuration of the magnetic head used for the evaluation.

The magnetic heads used for the evaluation of the recording and reproduction characteristics were the composite type magnetic heads with the basic structures shown in FIG. 8.

These composite type magnetic heads were formed by shaving the abutting faces of a pair of ferrite cores 91A and 91B at an angle, forming soft magnetic metal thin films 92A and 92B on them, inserting a gap material between the end faces of the soft magnetic metal thin films 92A and 92B by a gap material, and forming a magnetic gap g.

At the two sides of the magnetic gap g, nonmagnetic glass 93 is packed to secure contact with the magnetic tape. Further, a coil groove is provided on the ferrite core 91B.

Two types of magnetic heads (head I and head II) were used for the evaluation, but the basic structure of these heads was the same. Both used an Fe-Ga-Si-Ru alloy (saturation flux density Bs=14 kG) as the soft magnetic metal thin films 92A and 92B near the gap. The only difference lay in the gap length.

The dimensions of the magnetic heads are shown in Table 4.

TABLE 4

|  | Head material Bs | Gap length | Track width |
|---|---|---|---|
| Head I | 14 kG | 0.15 μm | 7.0 μm |
| Head II | 14 kG | 0.25 μm | 7.0 μm |

The recording and reproduction characteristics of the total four types of combinations of the two types of media (medium A and medium B) and the two types of magnetic heads (head I and head II) were compared to investigate the effect of the present invention. Table 5 shows examples of the combinations of the media and heads and the recording and reproduction characteristics of the same.

TABLE 5

|  | Medium-head | Reproduction output ($\lambda = 0.5$ μm) | Dipulse ratio |
|---|---|---|---|
| Embodiment | A-I | 0 dB | 0.10 |
| Comp. Ex. 1 | A-II | −2.0 dB | 0.35 |
| Comp. Ex. 2 | B-I | −0.5 dB | 0.40 |
| Comp. Ex. 3 | B-II | −3.0 dB | 0.55 |

From Table 5, it is learned that the recording and reproduction characteristics are best with a combination of a Co—O type perpendicular magnetic recording medium with a tilted direction of the axis of easy magnetization and ring type magnetic heads with a narrow gap length. That is, with this combination, the reproduction output is greatest at a short wavelength (recording wavelength of 0.5 μm), the dipulse ratio of the solitary reproduced wave in the case of recording the short wavelength is small, a substantially single-peak type waveform is obtained, and no complicated waveform processing is required.

Therefore, such a method of recording and reproduction by a combination of this medium and head may be said to be suited as a method of recording and reproducing a digital video signal.

As mentioned above, the perpendicular magnetic recording medium to which the present invention is applied has excellent magnetic characteristics and is superior in the reproduction output characteristic at short wavelengths as well, so excellent results can be expected when this is applied to a recording and reproduction apparatus having such a configuration.

Configuration of Recording and Reproduction Apparatus

As a digital VTR which converts a color video signal to a digital format and records it on a magnetic tape or other recording medium, a component type digital VTR of the D1 format and a component digital VTR of the D2 format for broadcasting stations have been commercialized.

The former D1 format digital VTR converts a luminance signal and first and second color difference signals from an analog to digital format at a sampling frequency of 13.5 MHz and 6.75 MHz, then performs predetermined signal processing and records the results on a magnetic tape. The sampling frequencies of the components have a ratio of 4:2:2, so this is also called the 4:2:2 system.

On the other hand, the latter D2 format digital VTR samples the composite color video signal by a signal of a frequency four times the frequency of the color sub-carrier wave signal, converts it frown an analog to digital format, performs predetermined signal processing, then records the result on a magnetic tape.

In both cases, the digital VTR's are designed on the premise of being used for broadcasting stations, so top priority is given to picture quality, and a digital color video signals converted from an analog to digital format so one sample consists of eight bits, for example, is recorded without any substantial compression.

Therefore, for example, in the D1 format digital VTR, even if a large sized cassette tape is used, a reproduction time of only about 1.5 hours at most can be obtained, so this is unsuitable for use as a general home VTR.

Therefore, in the present embodiment, a signal of a shortest wavelength of 0.5 μm is recorded on a track of a width of, for example, 5 μm so as to realize a recording density of $4 \times 10^5$ bit/mm$^2$ or more or $8 \times 10^5$ bit/mm$^2$ or more. By using this with a method which compresses the recording information in a manner giving little distortion upon reproduction, application to a digital VTR able to perform long recording and reproduction is possible even with use of a magnetic tape of a tape width of 8 mm or less.

The configuration of this digital VTR will be explained below:

a. Signal Processing Unit

First, an explanation will be made of the signal processing unit of the digital VTR used in the present embodiment.

Figure 9:
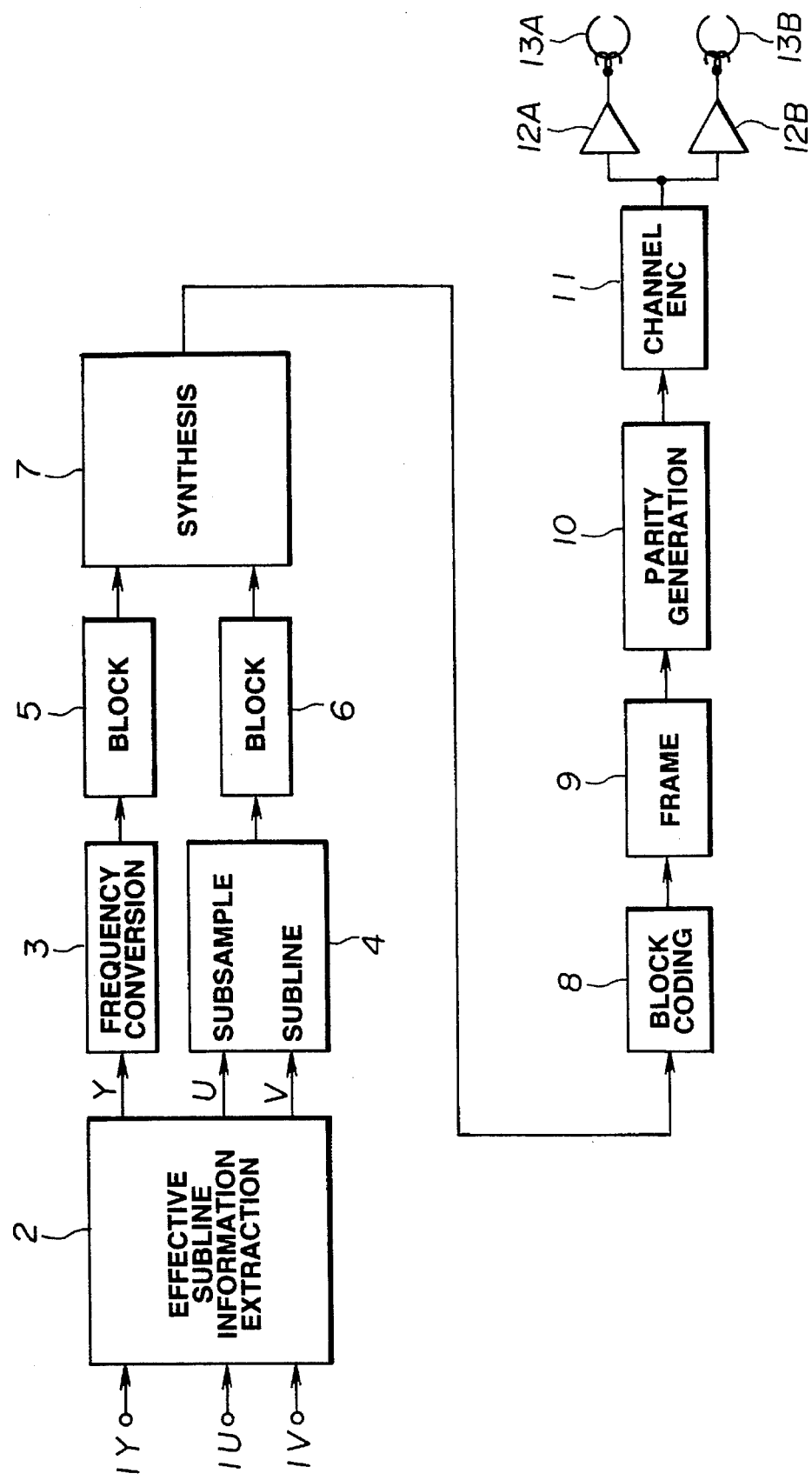
FIG. 9 is a block diagram of the configuration on the recording side of a digital VTR signal processing unit which records digital video signals compressed in a manner to give little distortion upon reproduction.

FIG. 9 shows the overall configuration of the recording side. A digital luminance signal Y and digital color difference signal U and V formed from the three primary color signals R, G, and B from a color video camera, for example, are supplied to the input terminals indicated by 1Y, 1U, and 1V, respectively. In this case, the clock rates of the signals are made the same as the frequencies of the component signals of the D1 format. That is, the sampling frequencies are made 13.5 MHz and 6.75 MHz and the number of bits per sample is made 8. Therefore, the amount of data of the signals supplied to the input terminals 1Y, 1U, and 1V becomes about 216 Mbps. In the signals, the data during the blanking time is removed, and the amount of data is compressed to about 167 Mbps by an effective information extraction circuit 2 which extracts only the data of the effective regions.

The luminance signal Y in the output of the valid information extraction circuit 2 is supplied to a frequency conversion circuit 3, where the sampling frequency is converted from 13.5 MHz to three-fourths of the same. As the frequency conversion circuit 3, for example, use is made of a thinning filter and effort made to prevent occurrence of aliasing distortion. The output signal of the frequency conversion circuit 3 is supplied to a block circuit 5, where the order of the luminance data is converted to an order of blocks. The block circuit 5 is provided for a block coding circuit 8 provided later.

Figure 11:
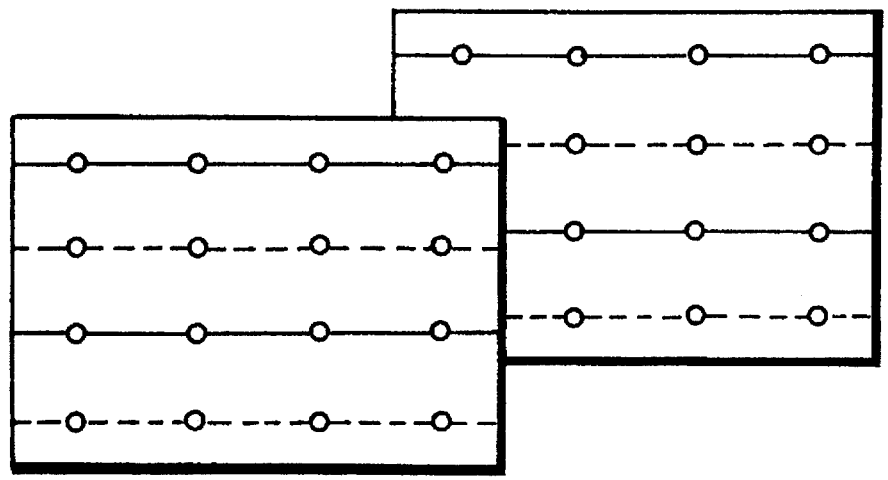
FIG. 11 is a line drawing of an example of a block for block coding.

FIG. 11 shows the configuration of unit blocks of the coding. The example is one of a three-dimension block. A large number of unit blocks of (4 lines×4 pixels×2 frames) are formed as shown in the figure. Note that in FIG. 11, the solid lines show the lines of odd number fields and the broken lines show the lines of even number fields.

Figure 12:
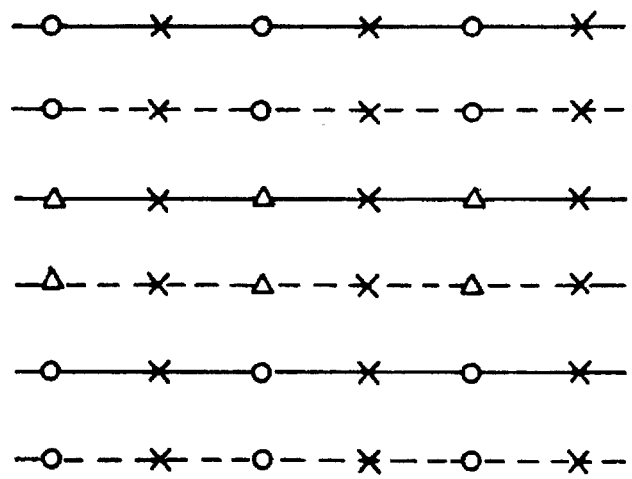
FIG. 12 is a line drawing for explaining subsampling and subline processing.

The color difference signals U and V in the output of the effective information extraction circuit 2 are supplied to the subsampling and subline circuit 4, where the sampling frequencies are converted from 6.75 MHz to half of the same, then the two digital color difference signals are selected mutually for each line and combined into data of one channel. Therefore, line-sequential digital color difference signals are obtained from the subsampling and subline circuit 4. FIG. 12 shows the structure of a pixel of a signal subjected to the subsampling and subline processing of the subsampling and subline circuit 4. In FIG. 12, o indicates a subsampling pixel of a first color difference signal U, Δ shows a sampling pixel of a second color difference signal V, and x shows the position of a pixel thinned out by subsampling.

The line-sequential output signal from the subsampling and subline circuit 4 is supplied to the block circuit 6. In the block circuit 6, color difference data in the order of scanning of the television signals is converted to data of a block order in the same way as with the other block circuit 5. The block circuit 6 converts the color difference data into a block configuration of (4 lines×4 pixels×2 frames) in the same way as the other block circuit 5. The output signals of the block circuit 5 and the block circuit 6 are supplied to a synthesis circuit 7.

In the synthesis circuit 7, the luminance signals and color difference signals converted to a block order are converted into data of one channel. The output signals of the synthesis circuit 7 are supplied to a block coding circuit 8. As the block coding circuit 8, use may be made of a coding circuit adapting to the dynamic range of each block (called an ADRC), explained later, a discrete cosine transform (DCT) circuit, etc. The output signal from the block coding circuit 8 is further supplied to the frame circuit 9 and converted to data of a frame configuration. In the frame circuit 9, crossover between the pixel system clock and recording system clock is performed.

Next, the output signal of the frame circuit 9 is supplied to an error correcting code parity generation circuit 10, where the parity of the error correcting code is produced. The output signal of the parity generation circuit 10 is supplied to a channel encoder 11, where channel coding reducing the low band portion of the recorded data is performed. The output signal of the channel encoder 11 is supplied to a pair of magnetic heads 13A and 13B through recording amplifiers 12A and 12B and rotary transformers (not shown) and is recorded on a magnetic tape. Note that the audio signals and video signals are separately compressed and encoded and then supplied to the channel encoder 11.

By the above signal processing, the 216 Mbps amount of input data is reduced to about 167 Mbps by extraction of only the effective scanning period and further is reduced to 84 Mbps by frequency conversion, subsampling, and subline processing. The data is compressed to about 25 Mbps by compression and coding by the block coding circuit 8, then the parity and subsequent additional information of the audio signals etc. are added, resulting in 31.56 Mbps as the amount of recorded data.

Next, an explanation will be made of the configuration of the reproduction side referring to FIG. 10.

Figure 10:
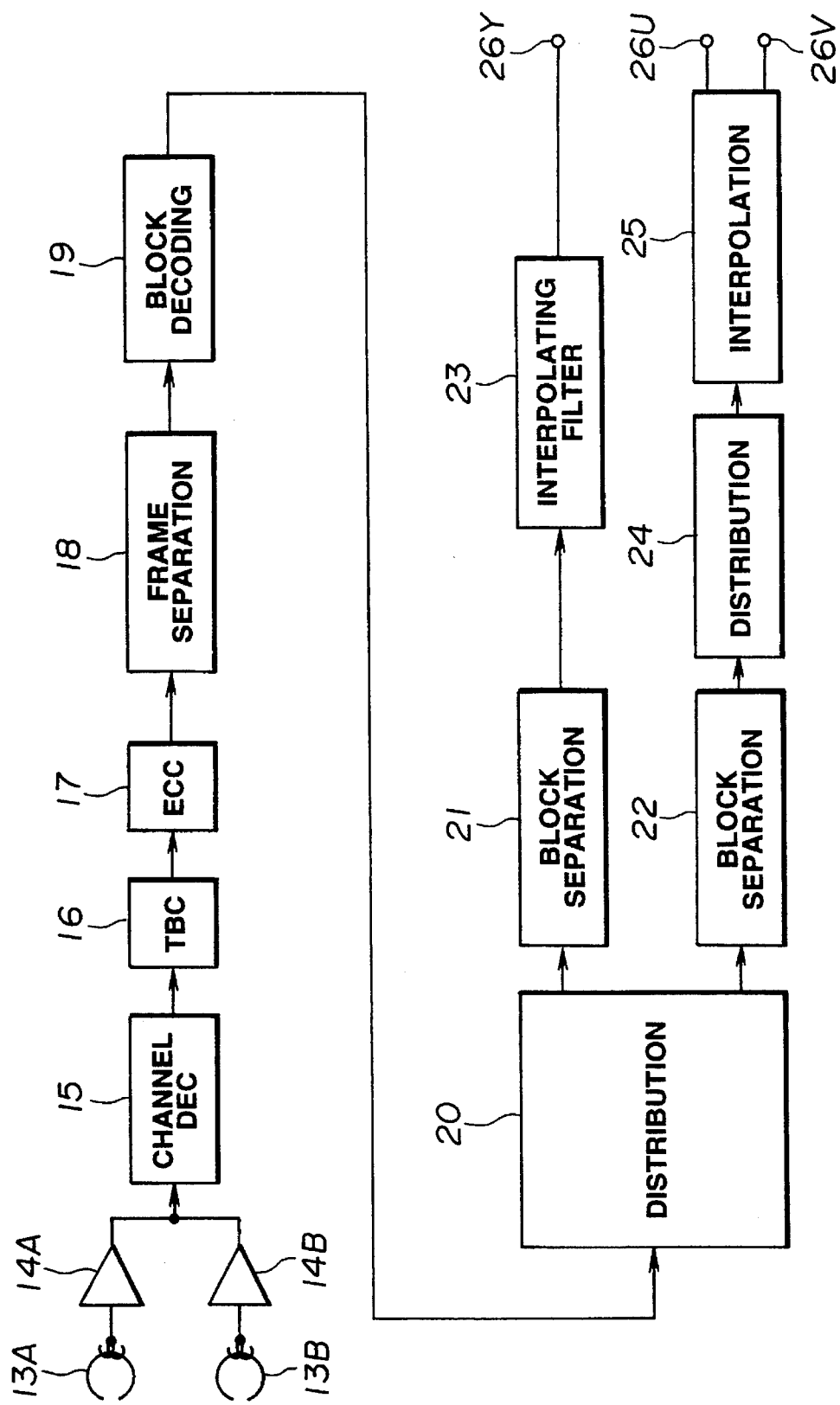
FIG. 10 is a block diagram of the configuration of the reproduction side of the signal processing unit.

At the time of reproduction, as shown in FIG. 10, first, the reproduction data from the magnetic heads 13A and 13B is supplied to the channel decoder 15 through the rotary transformers and the reproduction amplifiers 14A and 14B. In the channel decoder 15, the channel coding is demodulated. The output signal of the channel decoder 15 is supplied to a time base correction (TBC) 16. In the TBC circuit 16, the time base change component of the reproduction signal is removed. The reproduction data from the TBC circuit 16 is supplied to an ECC circuit 17, where error correction and error repair are performed using the error correcting code. The output signal of the ECC circuit 17 is supplied to the frame separation circuit 18.

The components of the block coding data are separated by the frame separation circuit 18 and are changed over from the clock of the recording system to the clock of the pixel system. The data separated by the frame separation circuit 18 is supplied to the block decoding circuit 19, where the reconstruction data corresponding to the original data is decoded in block units. The decoded data is supplied to the distribution circuit 20. At the distribution circuit 20, the decoded data is separated into the luminance signals and color difference signals. The luminance signals and color difference signals are supplied to the block separation circuits 21 and 22. The block separation circuits 21 and 22 convert the decoded data of the block order to the raster scanning order, opposite to the block circuit 56 on the transmission side.

The decoded luminance signal from the block separation circuit 21 is supplied to an interpolating filter 23. In the interpolating filter 23, the sampling rate of the luminance signal is converted from 3 fs to 4 fs (4 fs=13.5 MHz). The digital luminance signal Y from the interpolating filter 23 is taken out at the output terminal 26Y.

On the other hand, the digital color difference signals frown the block separation circuit 22 are supplied to the distribution circuit 24, where the line-sequential digital color difference signals U and V are separated into the digital color difference signals U and V. The digital color difference signals U and V from the distribution circuit 24 are supplied to the interpolation circuit 25 where they are interpolated. The interpolation circuit 25 interpolates the data of the lines and pixels which were thinned out using the reconstruction pixel data. Digital color difference signals U and V of a sampling rate of 2 fs are obtained from the interpolation circuit 25 and are taken out at the output terminals 26U and 26V.

b. Block Coding

As the block coding circuit 8 in FIG. 9, use is made of an adaptive dynamic range coding (ADRC) encoder. This ADRC encoder detects the maximum value MAX and minimum value MIN of the plurality of pixel data included in the blocks, detects the dynamic range DR of each block from the maximum value MAX and minimum value MIN, performs coding adapted to the dynamic range DR, and performs requantization by a number of bits smaller than the number of bits of the original pixel data. As another example of the block coding circuit 8, use may be made of a configuration wherein the pixel data of the blocks is subjected to discrete cosine transform processing (DCT), then the coefficient data obtained by this DCT is quantized and the quantized data is subjected to Run Length Huffman coding for compression and coding of the same.

Here, an explanation will be made of an example of an encoder which uses and ADRC encoder and does not result in picture deterioration even during multidubbing.

Figure 13:
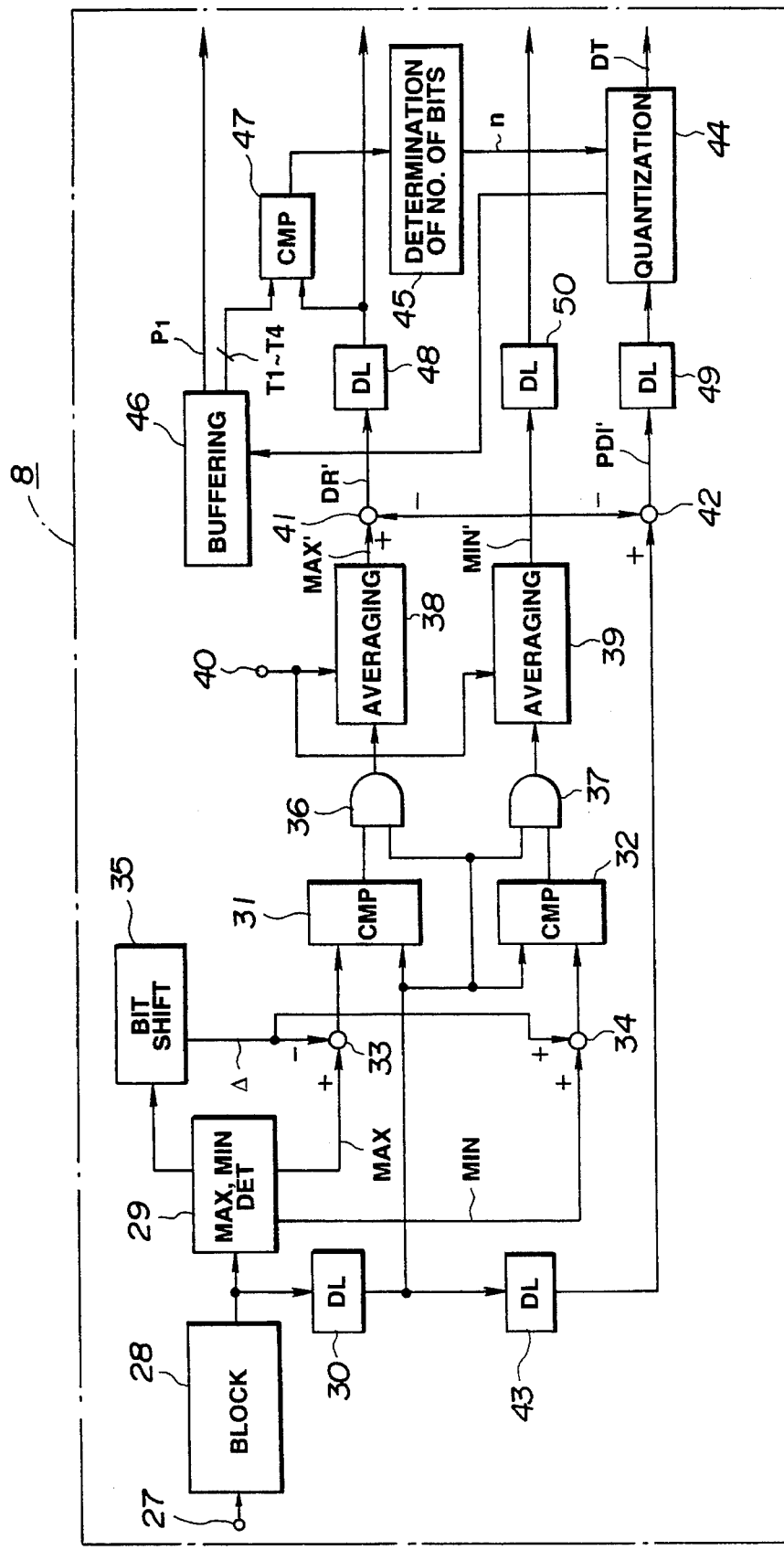
FIG. 13 is a block diagram of an example of a block coding circuit.

In FIG. 13, a digital video signal (or digital color difference signals) quantized to 8 bits per sample, for example, is input to the input terminal 27 from the synthesis circuit 7 of FIG. 9. The block data from the input terminal 27 is supplied to the maximum value and minimum value detection circuit 29 and the delay circuit 30. The maximum value and minimum value detection circuit 29 detects the minimum value MIN and the maximum value MAX for each block. From the delay circuit 30, the time and input data required for detection of the maximum value and the minimum value are delayed. The pixel data from the delay circuit 30 is supplied to the comparison circuit 31 and the comparison circuit 32.

The maximum value MAX from the maximum value and minimum value detection circuit 29 is supplied to the subtraction circuit 33, while the minimum value MIN is supplied to the addition circuit 34. The subtraction circuit 33 and the addition circuit 34 are supplied from the bit shift circuit 35 with the value of one quantization step width in the case of non-edge matching quantization by a fixed length of 4 bits ($\Delta = \frac{1}{16}$ DR). The bit shift circuit 35 is comprised so as to shift the dynamic range DR by four bits so as to perform the division operation of ($\frac{1}{16}$). The threshold value of (MAX$-\Delta$) is obtained from the subtraction circuit 33, while the threshold value of (MIN$+\Delta$) is obtained from the addition circuit 34. The threshold values from the subtraction circuit 33 and the addition circuit 34 are supplied to the comparison circuits 31 and 32, respectively. Note that the value $\Delta$ defining the threshold value is not limited to the quantization step width and may be a fixed value corresponding to the noise level.

The output signal of the comparison circuit 31 is supplied to the AND gate 36, while the output signal of the comparison circuit 32 is supplied to the AND gate 37. The AND gate 36 and the AND gate 37 are supplied with input data from the delay circuit 30. The output signal of the comparison circuit 31 becomes a high level when the input data is larger than a threshold value and therefore pixel data of input data included in the maximum level range of (MAX to MAX$-\Delta$) is extracted at the output terminal of the AND gate 36. On the other hand, the output signal of the comparison circuit 32 becomes a high level when the input data is less than the threshold value and therefore pixel data of input data included in the minimum level range of (MIN to MIN$+\Delta$) is extracted at the output terminal of the AND gate 37.

The output signal of the AND gate 36 is supplied to the averaging circuit 38, while the output signal of the AND gate 37 is supplied to the averaging circuit 39. The averaging circuits 38 and 39 calculate the average values for each block. A reset signal of the block period is supplied from the terminal 40 to the averaging circuits 38 and 39. An average value MAX' of the pixel data belonging to the maximum level range of (MAX to MAX$-\Delta$) is obtained from the averaging circuit 38, while an average value MIN' of the pixel data belonging to the minimum level range of (MIN to MIN$+\Delta$) is obtained from the averaging circuit 39. The average value MIN' is subtracted from the average value MAX' at the subtraction circuit 41. The dynamic range DR' is obtained thereby from the subtraction circuit 41.

Further, the average value MIN' is supplied to the subtraction circuit 42. The average value MIN' is subtracted from the input data coming through the delay circuit 43 at the subtraction circuit 42, and the data PDI after the minimum value is removed is formed. The data PDI and the modified dynamic range DR' are supplied to the quantization circuit 44. In this embodiment, use is made of a variable length ADRC where the number n of bits allocatable for the quantization may be made any of 0 bit (no code signal transferred), 1 bit, 2 bits, 3 bits, or 4 bits. Edge-matching quantization is performed there. The number n of allocated bits is determined in the bit number determination circuit 45 for each block, and the data of the number n of bits is supplied to the quantization circuit 44.

The variable length ADRC reduces the number n of allocated bits in blocks where the dynamic range is small and increases the number n of allocated bits in blocks where the dynamic range is large so as to enable efficient coding. That is, if the threshold values for when determining the number n of bits are made T1 to T4 (T1<T2<T3<T4), the blocks where (DR'<T1) are transferred only with regard to the information of the dynamic range DR', not the code signals, the blocks where (T1$\leq$DR'<T2) are made (n=1), the blocks where (T2$\leq$DR'<T3) are made (n=2), the blocks where (T3$\leq$DR'<T4) are made (n=3), and the blocks where (DR'>T4) are made (n=4).

In this variable length ADRC, it is possible to control the amount of the information generated by changing the threshold values T1 to T4 (so-called buffering). Therfore, a variable length ADRC may be used even for a transmission channel such as of the digital VTR of the present invention, where it is demanded that the amount of information generated per field or per frame be made a predetermined value.

In the buffering circuit 46, which determines the threshold values T1 to T4 for making the amount of information generated a predetermined value, a number, for example, 32, of combinations of threshold values (T1, T2, T3, and T4) are provided. These combinations of threshold values are differentiated by the parameter code Pi (i=0, 1, 2 . . . 31). Things are set so that as the number i of the parameter code Pi becomes larger, the amount of information generated is reduced monotonously. However, the quality of the reconstructed picture deteriorates along with the reduction of the amount of information generated.

The threshold values T1 to T4 from the buffering circuit 46 are supplied to the comparison circuit 47, while the dynamic range DR' sent through the delay circuit 48 is supplied to the comparison circuit 47. The delay circuit 48 gives a delay of the time DR' required for determination of the combination of the threshold values at the buffering circuit 46. At the comparison circuit 47, the dynamic range DR' of the block and the threshold values are compared. The comparison output is supplied to the bit number determination circuit 45, where the number n of allocated bits of the block is determined. In the quantization circuit 44, the dynamic range DR' and the number n of allocated bits are used and the data PDI after removal of the minimum value through the delay circuit 49 is converted into the code signal DT by edge matching quantization. The quantization circuit 44 is comprised, for example, of a ROM.

The dynamic ranges DR and average value MIN' modified through the delay circuits 48 and 50, respectively, are output. Further, a parameter code Pi showing the combination of the code signal DT and the threshold value are output. In this example, non-edge match quantized signals are subjected to edge match quantization based on the dynamic range information, so it is considered that there is little image deterioration at the time of dubbing.

c. Channel Encoder and Channel Decoder

Next, an explanation will be made of the channel encoder 11 and the channel decoder 15 of FIG. 9.

Figure 14:
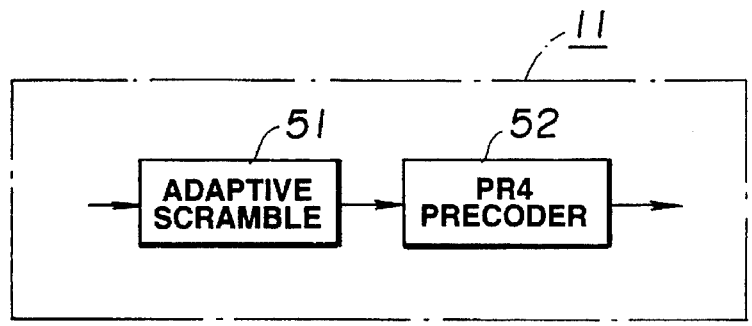
FIG. 14 is a block diagram of an outline of an example of a channel encoder.

In the channel encoder 11, as shown in FIG. 14, provision is made of a plurality of M series scramble circuits 51, which are adaptive type scramble circuits to which the output of the parity generation circuit 10 is supplied. It is constructed so that selection is made of the M series giving the output with the least high frequency component and DC component with respect to the input signals. Arithmetic processing of $1/1-D^2$ (where D is a unit delay circuit) is performed by a precodet 52 for the partial response class 4 detection system. The output of the precoder 52 is recorded and reproduced via the recording amplifiers 12A and 13A by the magnetic heads 13A and 13B. The reproduction output is amplified by the reproduction amplifiers 14A and 14B.

Figure 15:
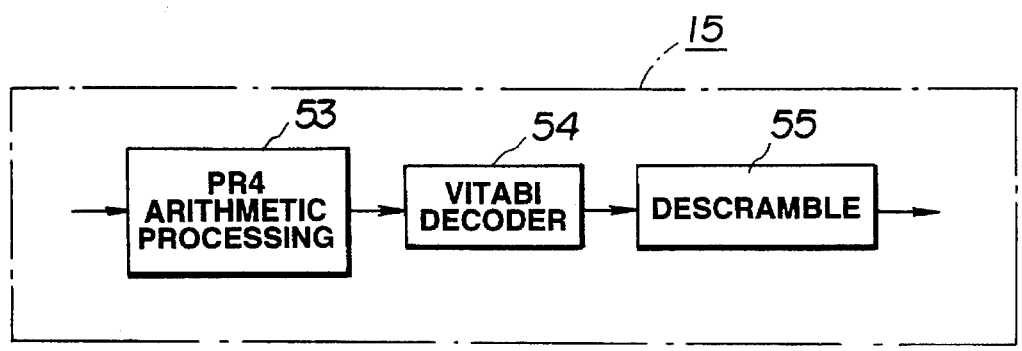
FIG. 15 is a block diagram of an outline of an example of a channel decoder.

On the other hand, in the channel decoder 15, as shown in FIG. 15, the arithmetic processing circuit 53 on the reproduction side of the partial response class 4 performs the operation of 1+D on the output of the reproduction amplifiers 14A and 14B. Further, a so-called Vitabi decoding circuit 54 performs decoding of data resistant to noise on the output of the arithmetic processing circuit 53 by an arithmetic operation using the correlation and reliability of data. The output of the Vitabi decoding circuit is supplied to a descramble circuit 55 and the data rearranged by the scramble processing on the recording side is returned to the original array for the reproduction of the original data. By use of the Vitabi decoding circuit 54 used in this embodiment, an improvement of the reproduction C/N conversion to 3 dB is obtained compared with the decoding by bits.

d. Running System

Figure 16:
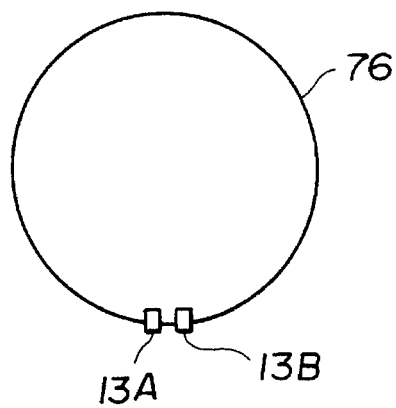
FIG. 16 is a plan view schematically showing an example of the arrangement of magnetic heads.

The magnetic head 13A and the magnetic head 13B are mounted on a drum 76 in an integral manner as shown in FIG. 16.

On the peripheral surface of the drum 76 a magnetic tape (not shown) is wound slanted at a winding angle slightly larger than or slightly smaller than 180°. This is to allow the magnetic head 13 A and the magnetic head 13B to simultaneously scan the magnetic tape.

Further, the magnetic head 13A and the magnetic head 13B are set so that their gaps are oriented to tilt in opposite directions (for example, the magnetic head 13A being tilted +2° with respect to the track width direction and the magnetic head 13B being tilted −20°). This is done so as to reduce the amount of crosstalk between adjoining tracks due to so-called azimuth loss.

Figure 17:
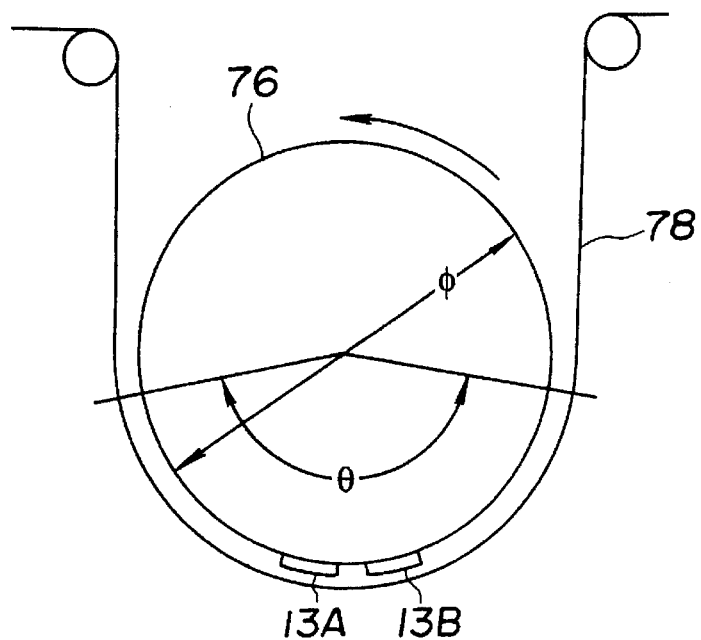
FIG. 17 is a plan view of an example of the configuration of a rotary drum and the state of winding of a magnetic tape.
Figure 18:
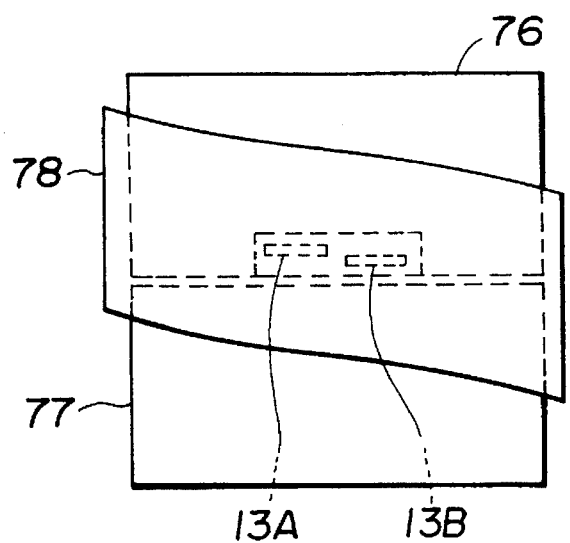
FIG. 18 is a front view of an example of the configuration of a rotary drum and the state of winding of a magnetic tape.

FIG. 17 and FIG. 18 show a more detailed configuration of the case where the magnetic heads 13A and 13B are made an integral structure (so-called double azimuth heads). For example, the integrally constructed magnetic heads 13A and 13B are mounted to an upper drum 76 which rotates at a high speed. A lower drum 77 is fixed in place. Here, the take-up angle θ of the magnetic tape 78 is 166° and the drum diameter φ is 16.5 mm.

Therefore, the magnetic tape 78 has the data of one file recorded on it divided among five tracks. By this segment system, it is possible to reduce the length of the tracks and it is possible to reduce the error derived from the linearity of the tracks.

As explained above, by simultaneously recording by double azimuth heads, it is possible to reduce the amount of error derived from the linearity compared with the positioning of a pair of magnetic heads at opposite angles of 180° and, further, it is possible to more accurately adjust the pairings since the distance between heads is small. Therefore, with such a running system, recording and reproduction on or from a narrow track is possible.

We claim:

1. A perpendicular magnetic recording medium characterized in that it has a magnetic layer having a main surface and comprised of a metal magnetic thin film on a nonmagnetic support, in that a half-value width of a switching field distribution obtained from a remanent magnetization curve in a direction of an axis of easy magnetization of the magnetic layer from which a shape magnetic anisotropy has been removed is no more than 40 kA/m, and in that an angle $\Theta_E$ formed between a direction of an axis of easy magnetization of the magnetic layer from which a shape magnetic anisotropy is removed and a direction normal to the main surface of the magnetic layer is $10° \leq \Theta_E \leq 40°$.

2. A perpendicular magnetic recording medium as set forth in claim 1, characterized in that the metal magnetic thin film is a Co—O perpendicular magnetization thin film having a composition of $(Co_{1-x}Ni_x)_{1-m}O_m$ (where, $0.03 \leq x \leq 0.10$, $0.1 \leq m \leq 0.3$).

3. A process of production of a perpendicular magnetic recording medium which forms a magnetic layer having a main surface and being made by a vapor deposition method on a nonmagnetic support, characterized in that there is an angle $\Theta$ between a normal direction of the main surface of the nonmagnetic support and a direction of incidence of a flow of vapor from a source of vaporization at the time of forming the magnetic layer such that the angle $\Theta$ is within a range of 10° to 40° such that a half-value width of a switching field distribution obtained from a remanent magnetization curve in a direction of an axis of easy magnetization of the magnetic layer from which a shape magnetic anisotropy has been removed is no more than 40 kA/m.

4. A method of perpendicular magnetic recording and/or reproduction characterized in that recording is performed using ring magnetic heads with a gap length Lg of no more than 0.18 μm on a perpendicular magnetic recording medium having as a magnetic layer on a nonmagnetic support a metal magnetic thin film which has a half-value width of a switching field distribution obtained from a remanent magnetization curve in an easy direction of magnetization from which a shape magnetic anisotropy is removed of no more than 40 kA/m.

5. A method as set forth in claim 3 or claim 4, characterized in that the metal magnetic thin film is a Co—O perpendicular magnetization thin film having a composition of $(Co_{1-x}Ni_x)_{1-m}O_m$ (where, $0.03 \leq x \leq 0.10$, $0.1 \leq m \leq 0.3$).

6. A method of perpendicular magnetic recording and/or reproduction characterized in that recording is performed using ring magnetic heads with a gap length Lg of no more than 0.18 μm on a perpendicular magnetic recording medium having a magnetic layer on a nonmagnetic support, the magnetic layer having a main surface and comprising a metal magnetic thin film which has an angle $\Theta_E$ formed between axes of easy magnetization of the magnetic layer from which a shape magnetic anisotropy is removed and a normal direction of the main surface of the magnetic layer of $10° \leq \Theta_E \leq 40°$ and in which a half-value width of a switching field distribution obtained from a remanent magnetization curve in a direction of an axis of easy magnetization of the magnetic layer from which a shape magnetic anisotropy has been removed is no more than 40 kA/m.

7. A method of perpendicular magnetic recording and/or reproduction characterized in that recording is performed using ring magnetic heads with a gap length Lg of no more than 0.18 μm on a perpendicular magnetic recording medium having a magnetic layer by recording digital signals while causing the ring magnetic heads to run along a direction which is tilted with respect to an axis of easy magnetization of the magnetic layer, the magnetic layer being provided as a metal magnetic thin film on a non-magnetic support, the metal magnetic thin film having a half-value width of a switching field distribution obtained from a remanent magnetization curve in an easy direction of magnetization from which a shape magnetic anisotropy is removed of no more than 40 kA/m.

* * * * *